United States Patent

Soon

[11] Patent Number: 5,901,206
[45] Date of Patent: May 4, 1999

[54] PORTABLE TELEPHONE WITH FLASHLIGHT

[76] Inventor: Min Tet Soon, P.O. Box A499, 89357 Inanam, Malaysia

[21] Appl. No.: 09/042,457

[22] Filed: Mar. 16, 1998

[51] Int. Cl.$^6$ .................................................. H04M 11/00
[52] U.S. Cl. ........................ 379/110.01; 455/556; 362/88
[58] Field of Search .............................. 379/110.01, 376, 379/396, 387, 419, 433, 434, 441, 457; 362/88; 455/556

[56] References Cited

U.S. PATENT DOCUMENTS

| | | | |
|---|---|---|---|
| 3,821,539 | 6/1974 | Kleinman | 362/88 |
| 4,618,917 | 10/1986 | Lee et al. | 362/88 |
| 5,029,205 | 7/1991 | Archer | 379/433 |
| 5,237,607 | 8/1993 | Diamantis | 379/419 |
| 5,587,645 | 12/1996 | Sciammarella et al. | 320/2 |

FOREIGN PATENT DOCUMENTS

| | | | |
|---|---|---|---|
| 1957678 | 5/1971 | Germany | 379/433 |
| 4-354232 | 12/1992 | Japan | 379/433 |
| 7-264278 | 10/1995 | Japan | 379/110.01 |

Primary Examiner—Wing F. Chan
Attorney, Agent, or Firm—Richard L. Miller, P.E.

[57] ABSTRACT

A portable telephone with flashlight that includes a portable telephone that is powered by a battery and has a front face, a back face, a top face, a bottom face, and a pair of side faces, and a flashlight disposed on the portable telephone. The flashlight extends axially from the top face of the portable telephone, in proximity to one side face of the pair of side a faces of the portable telephone. The flashlight includes a reflector that is substantially flush with the top face of the portable telephone, a bulb that is cradled axially in the reflector of the flashlight so as to project a beam of light axially of the portable telephone, and an ON/OFF switch that is disposed on the one side face of the pair of side faces of the portable telephone, in proximity to the top face of the portable telephone. The portable telephone functions as a handle for the flashlight to be gripped in the palm of a hand, with the flashlight being activated, and projecting a beam of light axially of the portable telephone, when the portable telephone is gripped in the palm of the hand and a finger of the hand depresses the ON/OFF switch of the flashlight.

1 Claim, 1 Drawing Sheet

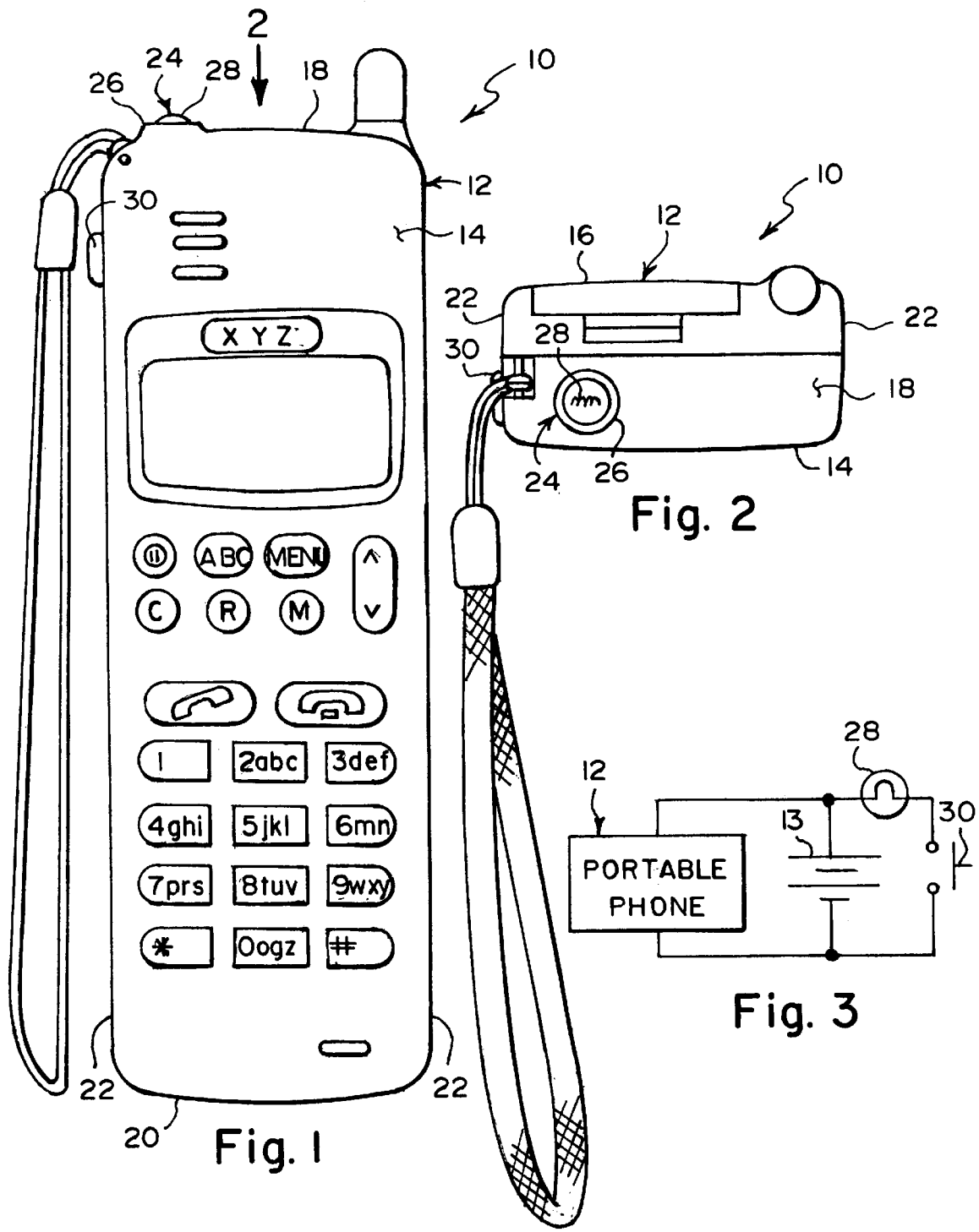

PORTABLE TELEPHONE WITH FLASHLIGHT

BACKGROUND OF THE INVENTION

1. Field of the Invention

The present invention relates to a portable telephone. More particularly, the present invention relates to a portable telephone with flashlight.

2. Description of the Prior Art

Numerous innovations for illuminated telephones have been provided in the prior art that will be described. Even though these innovations may be suitable for the specific individual purposes to which they address, however, they differ from the present invention.

FOR EXAMPLE, U.S. Pat. No. 4,618,917 to Lee et al. teaches a phone light accessory comprising a light producing element and a conductor element which is integrated into the hand set apparatus of many standard telephone designs.

ANOTHER EXAMPLE, U.S. Pat. No. 5,029,205 to Archer teaches a telephone handset that has a light bulb disposed on it and has a special switch that allows the light to automatically illuminate upon using the phone. The switch changes from an open position to a closed one upon a change in the orientation of gravity. One embodiment of the switch includes a hollow chamber having two separate contact plates disposed at one end and a freely sliding conductive manner that comes into contact with the contacts upon picking up the phone. A second switch embodiment includes three parallel pins with a central one of the pins having a hanging pivoting member that serves to contact one of the other pins upon a change in gravitational orientation. Also included is a removable socket member to facilitate replacement of the bulb.

STILL ANOTHER EXAMPLE, U.S. Pat. No. 5,237,607 to Diamantis teaches a dial illuminating assembly that allows for minimum power operation while maintaining uniformity of illumination in a telephone dial. The dial illumination assembly includes a plurality of fiber optic light guides for receiving light rays emanating from a light source and for directing these light rays to a plurality of translucent buttons. Illumination of the translucent buttons is achieved by creating multiple abraded surfaces on the light guides for dispersing the light rays in the vicinity of each translucent button. The light guides are routed along opposed sides of the translucent buttons with abraded surfaces on the light guides being positioned next to each button for providing the desired illumination. The dial illuminating assembly directs light rays so efficiently that only one light source is needed to provide uniform illumination in standard telephone dials.

FINALLY, YET ANOTHER EXAMPLE, U.S. Pat. No. 5,587,645 to Sciammarella et al. teaches a battery charger having a night light for use with a cordless telephone. The battery charger is energized by being plugged into a standard AC outlet and includes a cradle for receiving a cordless telephone handset having rechargeable batteries. The battery charger includes a photo transistor for detecting the level of light impinging on the battery charger and a lamp for providing illumination. When AC power is cut off and the photo transistor detects that the light level is below a predetermined level, the lamp is powered by the handset battery to provide illumination and to enable a user to locate the handset during low light conditions while it is being charged.

It is apparent that numerous innovations for illuminated telephones have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a mobile telephone with flashlight that avoids the disadvantages of the prior art.

ANOTHER OBJECT of the present invention is to provide a mobile telephone with flashlight that is simple and inexpensive to manufacture.

STILL ANOTHER OBJECT of the present invention is to provide a mobile telephone with flashlight that is simple to use.

BRIEFLY STATED, YET ANOTHER OBJECT of the present invention is to provide a portable telephone with flashlight that includes a portable telephone that is powered by a battery and has a front face, a back face, a top face, a bottom face, and a pair of side faces, and a flashlight disposed on the portable telephone. The flashlight extends axially from the top face of the portable telephone, in proximity to one side face of the pair of side faces of the portable telephone. The flashlight includes a reflector that is substantially flush with the top face of the portable telephone, a bulb that is cradled axially in the reflector of the flashlight so as to project a beam of light axially of the portable telephone, and an ON/OFF switch that is disposed on the one side face of the pair of side faces of the portable telephone, in proximity to the top face of the portable telephone. The portable telephone functions as a handle for the flashlight to be gripped in the palm of a hand, with the flashlight being activated when the portable telephone is gripped in the palm of the hand and a finger of the hand depresses the ON/OFF switch of the flashlight.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is diagrammatic front elevational view of the present invention;

FIG. 2 is a diagrammatic top plan view taken generally in the direction of arrow 2 in FIG. 1; and FIG. 3 is circuit drawing of the present invention.

LIST OF REFERENCE NUMERALS UTILIZED IN THE DRAWING 10 portable telephone with flashlight of the present invention
12 portable telephone
13 battery of portable telephone 13
14 front face of portable telephone 13
16 back face of portable telephone 13
18 top face of portable telephone 13
20 bottom face of portable telephone 13
22 pair of side faces of portable telephone 13
24 flashlight 26 reflector of flashlight 24
28 bulb of flashlight 24
30 ON/OFF switch of flashlight 24

DETAILED DESCRIPTION OF THE PREFERRED EMBODIMENT

Referring now to the figures in which like numerals indicate like parts, and particularly to FIGS. 1 and 2, the portable telephone with flashlight of the present invention is shown generally at 10.

The configuration of the portable telephone with flashlight 10 can best be seen in FIGS. 1 and 2, and as such will be discussed with reference thereto.

The portable telephone with flashlight 10 comprises a portable telephone 12 that is powered by a battery 13 (see FIG. 3) and has a front face 14, a back face 16, a top face 18, a bottom face 20, and a pair of side faces 22.

The portable telephone with flashlight 10 further comprises a flashlight 24 that extends axially from the top face 18 of the portable telephone 12, in proximity to one side face of the pair of side faces 22 of the portable telephone 12.

The flashlight 24 comprises a reflector 26 that is substantially flush with the top face 18 of the portable telephone 12, a bulb 28 cradled axially in the reflector 26 of the flashlight 24 so as to project a beam of light axially of the portable telephone 24, and an ON/OFF switch 30 that is disposed on the one side face of the pair of side faces 22 of the portable telephone 12, in proximity to the top face 18 of the portable telephone 12, with the portable telephone 12 functioning as a handle for the flashlight 24 to be gripped in the palm of the hand, and with the flashlight 24 being activated, and projecting a beam of light axially of the portable telephone 12, when the portable telephone 12 is gripped in the palm of the hand and a finger of the hand depresses the ON/OFF switch 30 of the flashlight 24.

The circuit of the portable telephone with flashlight 10 can best be seen in FIG. 3, and as such will be discussed with reference thereto.

The portable telephone 12 and the bulb 28 of the flashlight 24 are in parallel electrical communication with, and powered by, the battery 13 of the portable telephone 12 so as to allow the portable telephone 12 and the flashlight 24 to be powered by the same battery, i.e. the battery 13 of the portable telephone 12, with the ON/OFF switch 30 of the flashlight 24 being in serial electrical communication with the bulb 28 of the flashlight 24.

It will be understood that each of the elements described above, or two or more together, may also find a useful application in other types of constructions differing from the types described above.

While the invention has been illustrated and described as embodied in a mobile telephone with flashlight, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A portable telephone with flashlight, comprising:

a) a portable telephone being powered by a battery and having a front face, a back face, a top face, a bottom face, and a pair of side faces; and b) a flashlight disposed on said portable telephone; said flashlight extending axially from said top face of said portable telephone, in proximity to one side face of said pair of side faces of said portable telephone; said flashlight comprising a reflector being substantially flush with said top face of said portable telephone; said flashlight further comprising a bulb being cradled axially in said reflector of said flashlight so as to project a beam of light axially of said portable telephone; said flashlight further comprising an ON/OFF switch being disposed on said one side face of said pair of side faces of said portable telephone, in proximity to said top face of said portable telephone; said portable telephone functioning as a handle for said flashlight to be gripped in the palm of a hand, and with said flashlight being activated, and projecting a beam of light axially of said portable telephone, when said portable telephone is gripped in the palm of the hand and a finger of the hand depresses said ON/OFF switch of said flashlight; said portable telephone and said flashlight being in parallel electrical communication with, and powered by, said batters of said portable telephone so as to allow said portable telephone and said flashlight to be powered by said battery of said portable telephone, with said ON/OFF switch of said flashlight being in serial electrical communication with said flashlight.

* * * * *